(12) United States Patent
Knodt et al.

(10) Patent No.: US 7,697,851 B2
(45) Date of Patent: Apr. 13, 2010

(54) USER INITIATED ALERTS IN A DOCUMENT PROCESSING ENVIRONMENT

(75) Inventors: Kurt Knodt, Los Altos, CA (US); Soiba Mohammad, Sunnyvale, CA (US); Yue Liu, San Jose, CA (US); Lifen Tian, Sunnyvale, CA (US); Yao-Tian Wang, Sunnyvale, CA (US); Yi Ding, Saratoga, CA (US); Yuwen Wu, Sunnyvale, CA (US)

(73) Assignee: Ricoh Company, Ltd., Tokyo (JP)

( * ) Notice: Subject to any disclaimer, the term of this patent is extended or adjusted under 35 U.S.C. 154(b) by 683 days.

(21) Appl. No.: 11/499,026

(22) Filed: Aug. 3, 2006

(65) Prior Publication Data

US 2008/0031639 A1 Feb. 7, 2008

(51) Int. Cl.
*G03G 15/00* (2006.01)
(52) U.S. Cl. .............................. 399/8; 399/81
(58) Field of Classification Search ...................... 399/8, 399/81
See application file for complete search history.

(56) References Cited

U.S. PATENT DOCUMENTS

| | | | |
|---|---|---|---|
| 5,424,808 A * | 6/1995 | Maekawa et al. | 399/8 |
| 7,015,808 B1 | 3/2006 | Sattler et al. | |
| 7,337,472 B2 * | 2/2008 | Olsen et al. | |
| 7,343,114 B2 * | 3/2008 | Uruta | 399/8 |
| 7,409,206 B2 * | 8/2008 | Bronstein | |
| 2002/0021453 A1 * | 2/2002 | Sakamoto et al. | |
| 2003/0093710 A1 * | 5/2003 | Hashimoto et al. | |
| 2004/0246120 A1 | 12/2004 | Benner et al. | |
| 2005/0141034 A1 | 6/2005 | Ohta | |
| 2005/0162716 A1 | 7/2005 | Baba | |

(Continued)

FOREIGN PATENT DOCUMENTS

| | | |
|---|---|---|
| EP | 0 851 660 A2 | 7/1998 |
| EP | 1 505 769 A2 | 2/2005 |
| JP | 2002268850 A * | 9/2002 |

OTHER PUBLICATIONS

European Patent Office, "European Search Report", foreign application No. EP 07 25 3054, received Dec. 24, 2007, 5 pages.
Claims, foreign application No. EP 07 25 3054, 5 pages.

*Primary Examiner*—Susan S Lee
(74) *Attorney, Agent, or Firm*—Hickman Palermo Truong & Becker LLP; Edward A. Becker

(57) ABSTRACT

A method and apparatus for processing electronic documents is provided. A request, from a first user, to issue an alert to a second user that may have submitted a print request to the printing device is received at the printing device. The printing device may be attempting to process the print request submitted by the second user when the printing device receives the request from the first user. The first user may not know the identity of the second user. The printing device consults contact data that identifies how to contact the second user. The printing device thereafter issues the alert to the second user in accordance with the contact data. Upon receiving the alert, the second user is informed of the current condition of the printing device, e.g., the printing device may be experiencing a problem that prevents the second user's print request from being fully processed.

51 Claims, 12 Drawing Sheets

U.S. PATENT DOCUMENTS

2005/0183141 A1* 8/2005 Sawada
2005/0286090 A1* 12/2005 Ahne et al.
2006/0078859 A1 4/2006 Mullin
2007/0036314 A1* 2/2007 Kloberdans et al.
2007/0046989 A1* 3/2007 Shima
2007/0116213 A1* 5/2007 Gruchala et al.

* cited by examiner

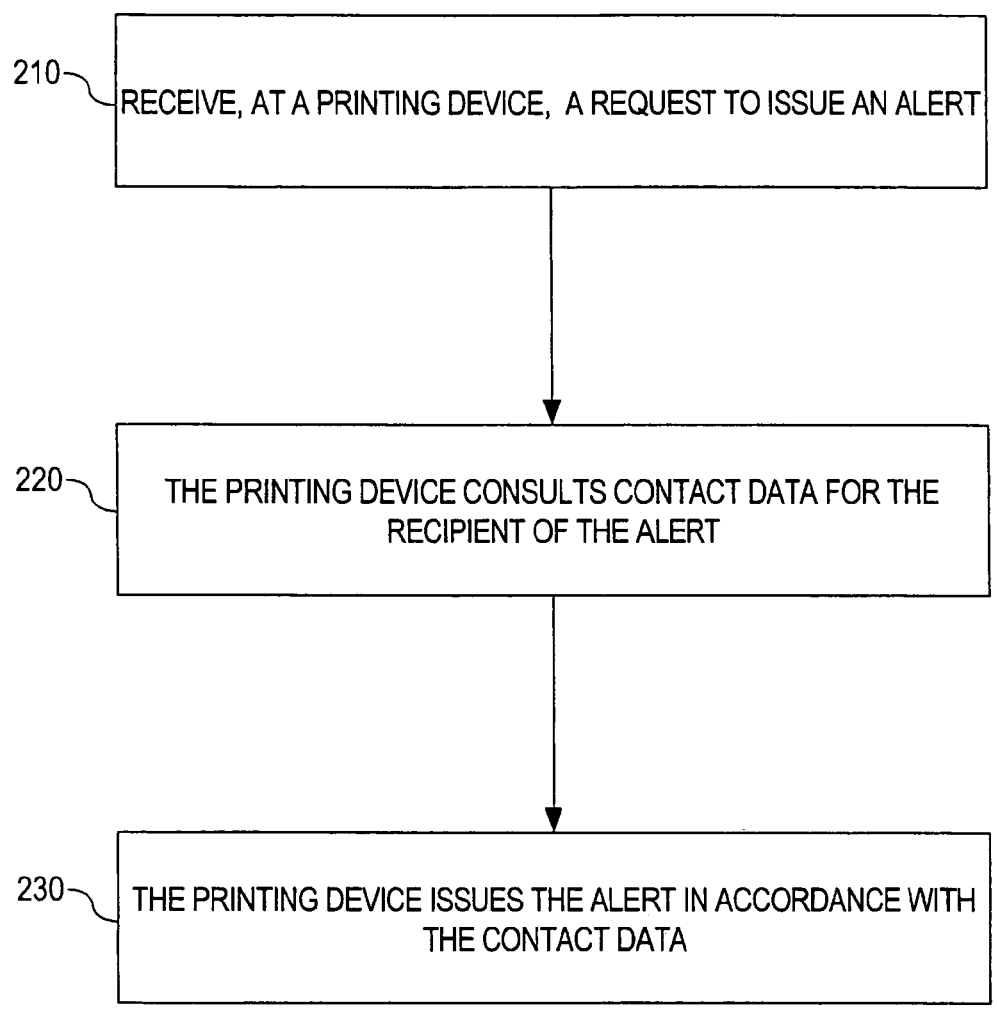

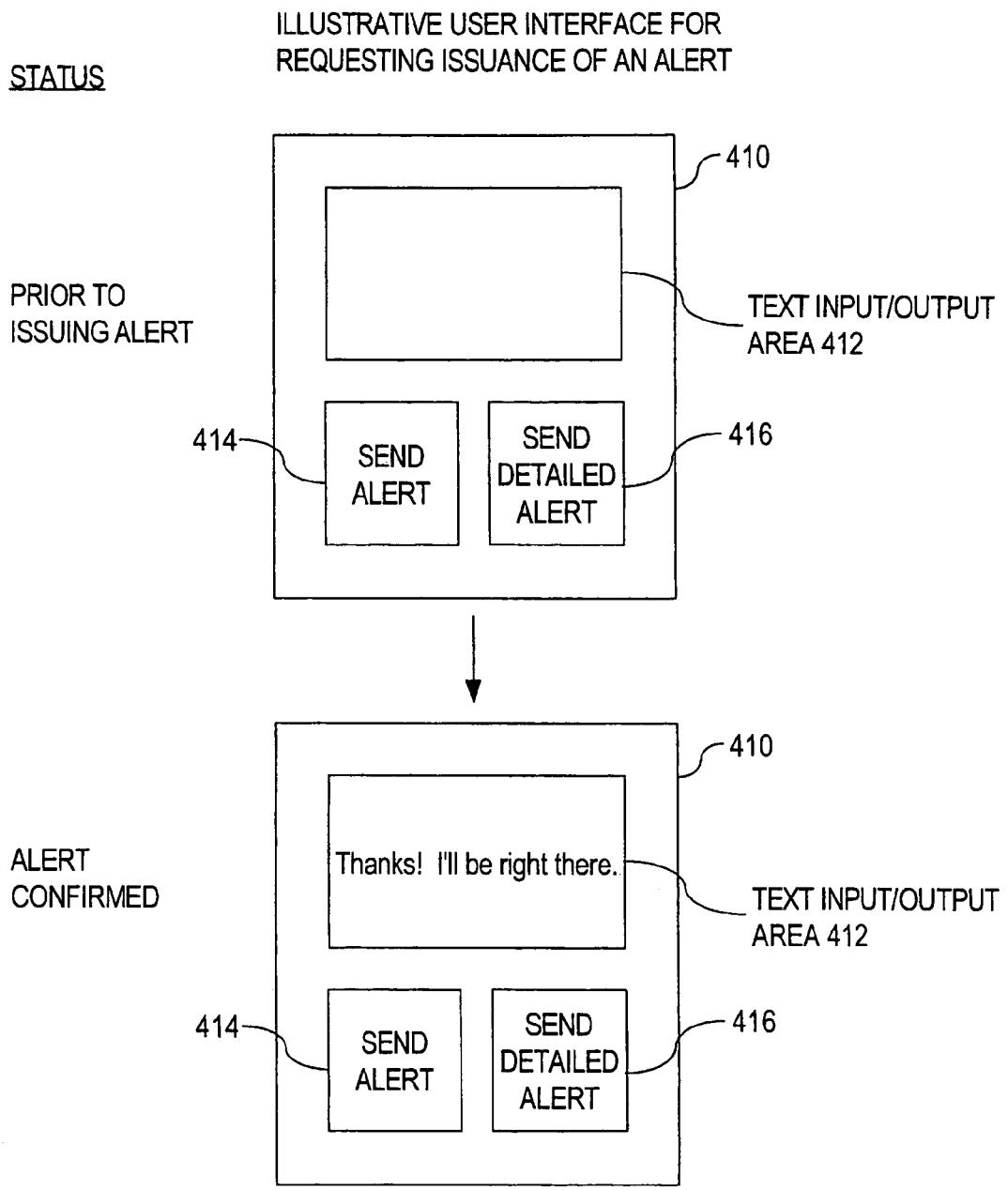

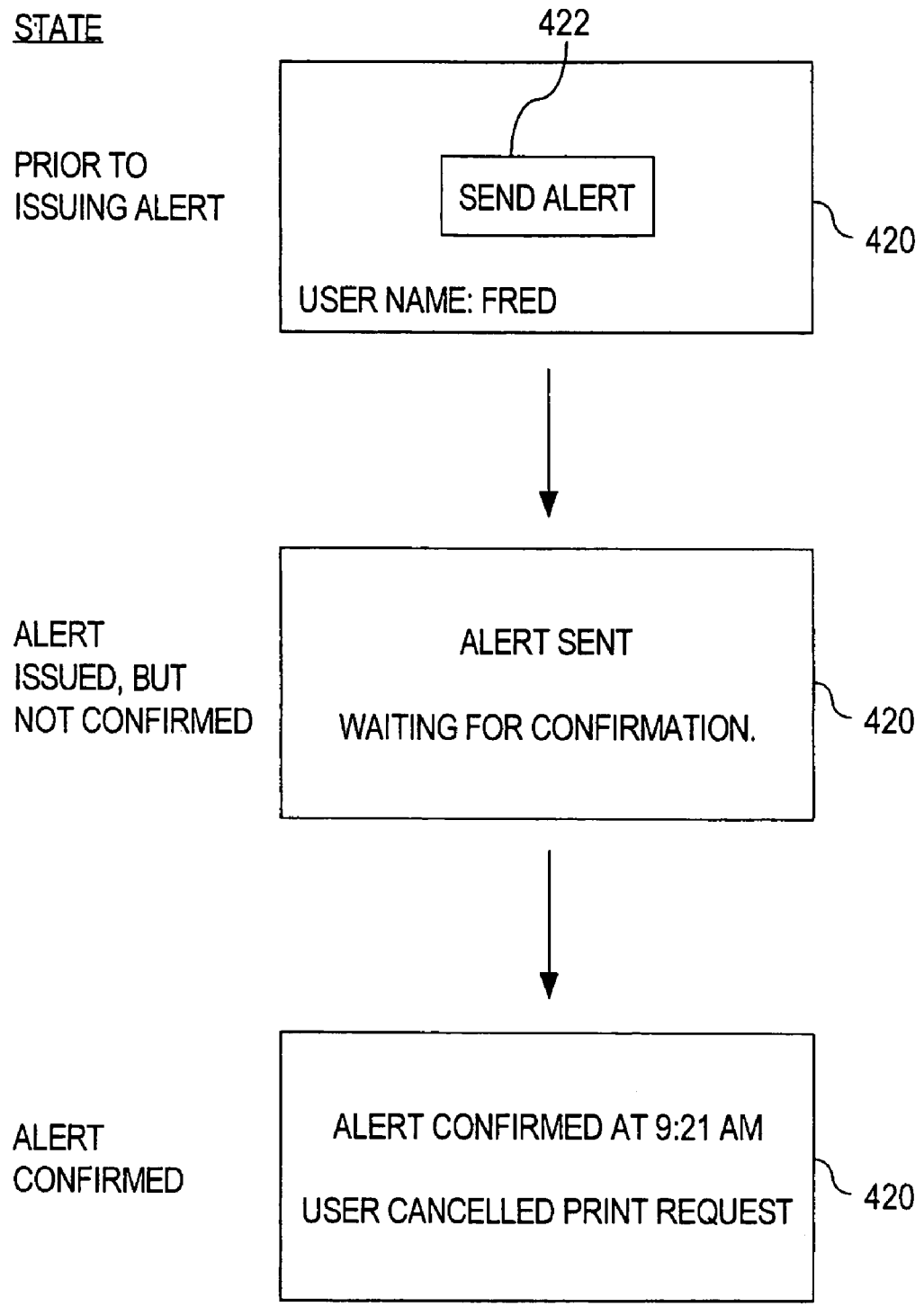

ILLUSTRATIVE USER INTERFACE FOR
RECEIVING AN ALERT

FIG. 5D
ILLUSTRATIVE USER INTERFACE FOR RECEIVING AN ALERT
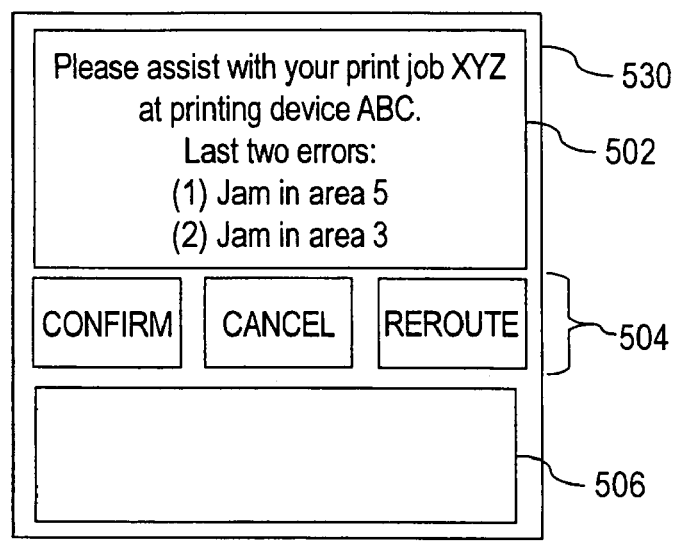
Example of alert displayed to a user
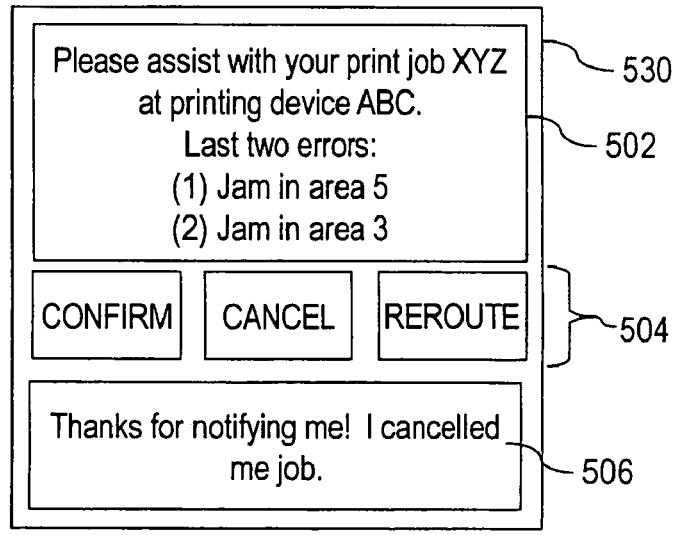
Example of a user confirming receipt of the alert.

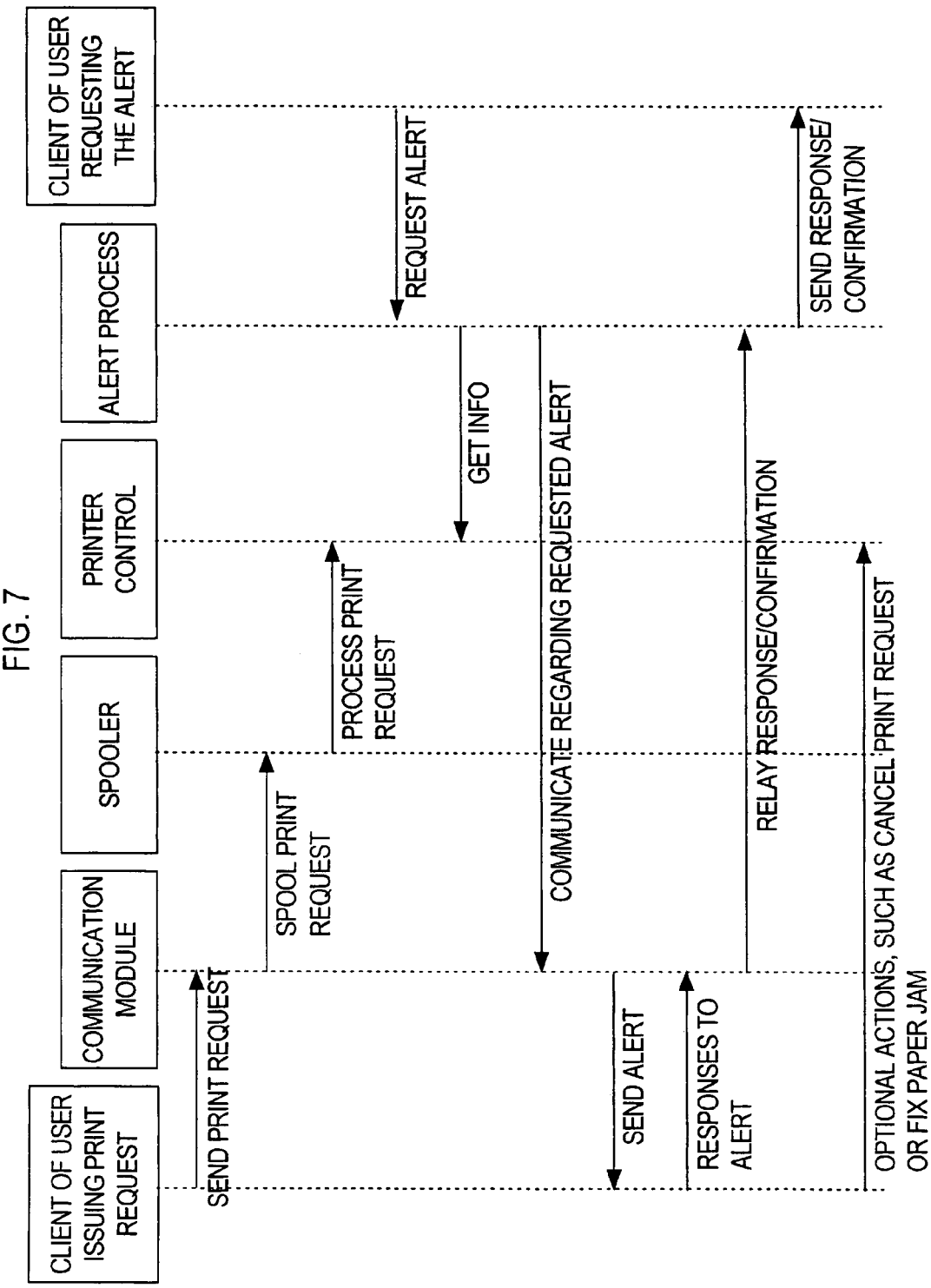

USER INITIATED ALERTS IN A DOCUMENT PROCESSING ENVIRONMENT

FIELD OF THE INVENTION

The present invention relates to processing electronic documents using an alert.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Typically, printing devices in an office environment are often shared by many people. For example, it is not uncommon for a single color printer to be shared by as many as one hundred people.

The functionality that printing devices are capable of provided has steadily grown over time. To illustrate, certain printing devices, referred to as multi-function peripherals (MFP), are not only capable of performing printing functionality, but are also capable of performing copying, faxing, and/or scanning functions as well. As printing devices become capable of providing more services, the need to share access to printing devices will likely continue in the future.

Printing devices are often left unattended and are operated without a dedicated operator. An IT department or a local administrator is often responsible for managing a printing device. Typically, the primary focus of an IT department or a local administrator is the general maintenance of the devices and networks they support. As a result, the party responsible for maintaining a printing device may not be aware that the printing device is experiencing a problem until long after the problem occurred. Illustrative examples of problems that a printing device may encounter in operation include the printing device running out of paper, the printing device becoming jammed, and the output tray of the printing device becoming too full to accommodate additional output. Often, a printing device may encounter a problem that prevents it from operating normally.

SUMMARY

Techniques are provided for processing electronic documents using an alert. An alert is a communication, sent from a first user to a second user, to inform the second user that a printing device, to which the second user sent a request to process a document, is experiencing a problem. The problem being experienced by the printing device may prevent the printing device from processing any further requests from users. In this way, a first user may inform a second user that the printing device is experiencing a problem, and the second user may thereafter choose to assist completion of his or her pending request by addressing the problem being experienced by the printing device.

In an embodiment of the invention, a first user may cause a request to issue an alert to be received at a printing device. For example, the first user may configure a panel of the printing device to make the request to issue the alert, or the first user may use a client to send, over a network, to the printing device, the request to issue the alert. The first user may make a request to issue the alert without identifying which user should receive the alert.

Upon receiving the request to issue the alert, the printing device determines which users should receive the alert, and consults contact data that identifies how to contact one or more recipients that are to receive the alert. For example, the printing device may identify that the alert is to be sent to a second user because, at the time when the printing device receives the request to issue an alert from the first user, the printing device is unable to complete processing of a print request issued by the second user.

The printing device thereafter issues the alert to one or more recipients in accordance with the contact data. Upon receiving the alert, a recipient of the alert is informed of the current condition of the printing device, e.g., the printing device may be experiencing a problem that prevents the user's print request from being fully processed. Certain interfaces for receiving an alert may allow the recipient of the alert to perform an action through the interface, such as confirming receipt of the alert to the first user that initiated the alert, cancelling the print request, or rerouting the print request from the printing device experiencing the problem to a different printing device.

BRIEF DESCRIPTION OF THE DRAWINGS

Embodiments of the present invention are illustrated by way of example, and not by way of limitation, in the figures of the accompanying drawings and in which like reference numerals refer to similar elements and in which:

FIG. 2 is a flowchart illustrating the functional steps of processing an electronic document using an alert according to an embodiment of the invention;

FIG. 4B is a graphical depiction of a workflow of an illustrative graphical user interface for requesting the issuance of an alert according to one embodiment of the invention;

FIG. 4C is a graphical depiction of a workflow of an illustrative graphical user interface for requesting the issuance of an alert according to another embodiment of the invention;

FIG. 5D is a graphical depiction of an illustrative graphical user interface for receiving an alert according to another embodiment of the invention;

FIG. 7 is a sequence diagram of processing an alert according to one embodiment of the invention.

DETAILED DESCRIPTION

In the following description, for the purposes of explanation, numerous specific details are set forth in order to provide a thorough understanding of the embodiments of the invention presented herein. It will be apparent, however, that the embodiments of the invention presented herein may be practiced without these specific details. In other instances, well-known structures and devices are shown in block diagram form in order to avoid unnecessarily obscuring the embodiments of the invention presented herein.

Overview

Figure 1:
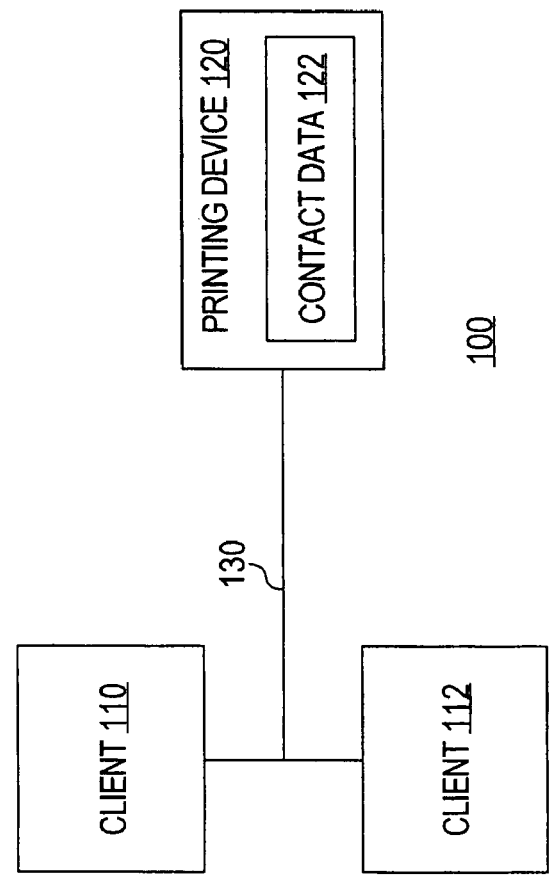
FIG. 1 is a block diagram of an illustrative system according to an embodiment of the invention.

FIG. 1 is a block diagram of an illustrative system 100 according to an embodiment of the invention. System 100 may be used to process an electronic document using an alert. System 100 includes a clients 110 and 112, printing device 120, and communications link 130.

Clients 110 and 112 may be implemented by any medium or mechanism that provides for communicating with printing device 120. For example, a user may use a client to issue a request to process an electronic document to printing device 120. A user may also use a client to send, to printing device 120, a request to issue an alert. For purposes of providing a clear example, only two clients are depicted in FIG. 1; however, embodiments of the invention may employ any number of clients, e.g., one client or a plurality of clients. Non-limiting, illustrative examples of a client include a web-browser, a software application, a wireless device, a cell phone, a printer driver, and a personal computer (PC).

For ease of explanation, certain embodiments of the invention shall be described with reference to client 110 sending a request to print a physical copy of an electronic document (hereafter referred to as a "a print request") to printing device 120, and client 112 sending a request to issue an alert to printing device 120. In some embodiments of the invention, a client may be configured to only perform only one of: (a) sending a request to process an electronic document to printing device 120, and (b) sending a request to issue an alert to printing device 120. As a result, while each client is capable of communicating with printing device 120, one client may communicate with printing device 120 in a different way than another client.

Printing device 120 may be implemented by any medium or mechanism that provides for printing a document. Non-limiting, illustrative examples of printing device 120 include a printer and a multi-function peripheral (MFP).

For purposes of providing a clear example, certain embodiments of the invention shall be described with reference to printing device 120 receiving a print request from client 110. However, embodiments of the invention are not limited to the context where printing device 120 prints a physical copy of an electronic document.

Printing device 120 stores contact data 122. Contact data 122 is data that identifies how to contact a user to which an alert is to be sent. Contact data 122 may specify that a user is to receive an alert using a variety of different delivery mechanisms. To illustrate, contact data 122 may specify that a particular user is to receive an alert via an instant message (IM), an email, a phone call, an audible indicator played at a particular client, a cell-phone text message, a pager, a pop-up window displayed on a client, and a message displayed through an interface displayed on a client. In addition, contact data 122 specifies how to reach each user over a particular delivery mechanism, e.g., if a user is to receive an alert via a prerecorded voice message, then contact data 122 identifies a phone number for the user, and if a user is to receive an alert via an email, then contact data 122 identifies an email address for the user. Contact data 122 may specify that a particular user is to receive an alert over any number of delivery mechanisms.

For example, contact data 122 for a first user may specify that the first user is to receive alerts by sending the alert by issuing a message to a software application executing on a machine at a particular network address, contact data 122 for a second user may specify that the second user is to receive alerts via email at a particular email address, and contact data 122 for a third user may specify that the third user is to receive alerts via an instant message service using a particular instant message username.

Printing device 120 may populate contact data 122 using data contained in a request, received by printing device 120, to process an electronic document. For example, contact data 122 may be updated to identify a network address or username of a user that sent a print request to printing device 120 based on information contained within a received print request. Alternately or additionally, printing device 120 may populate contact data 122 by exposing an interface through which a user can submit contact data 122. For example, printing device 120 may allow a user to either (a) enter contact data 122 for the user through a panel displayed on printing device 120, or (b) send, from a client, contact data 122 for the user to printing device 120 over communications link 130. In this way, a user can update contact data 122 to contain information that could not otherwise be collected by examining communications sent from the user to printing device 120, such as the user's cell phone number, instant message (IM) address, and pager number. Alternately or additionally, contact data 122 may be an attribute of the operating system of printing device 120.

Communications link 130 may be implemented by any medium or mechanism that provides for the exchange of data between a client and a printing device. Examples of communications link 130 include, without limitation, a network such as a Local Area Network (LAN), Wide Area Network (WAN), Ethernet or the Internet, or one or more terrestrial, satellite or wireless links.

Having described an illustrative system that may be used to process an electronic document using an alert according to an embodiment of the invention, the functional steps of issuing an alert according to an embodiment of the invention shall now be presented.

Making a Request to Issue an Alert to a Printing Device

FIG. 2 is a flowchart illustrating the functional steps of processing an electronic document using an alert according to an embodiment of the invention. The explanation of the steps of FIG. 2 shall make reference to system 100 of FIG. 1.

In step 210, a request to issue an alert is received at printing device 120. For ease of explanation, the user who makes the request to issue the alert in step 210 shall be referred to as the "initiating" user. The initiating user may wish to make a request to issue an alert to printing device 120 because printing device 120 is experience a problem that prevents its normal operation. For example, the problem being experienced by printing device 120 may prevent printing device 120 from further processing print requests received by printing device 120.

Figure 3A:
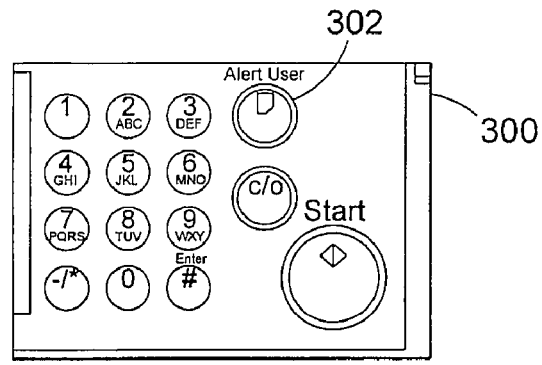
FIG. 3A is a graphical depiction of an interface, provided by a printing device, through which a request for the issuance of an alert may be made according to an embodiment of the invention.

The request to issue the alert may be initiated at a variety of locations. In an embodiment, the initiating user may use an interface provided by printing device 120 to make the request to issue the alert. Such an interface is depicted in FIG. 3A. Interface 300 of FIG. 3A is displayed on printing device 120. The initiating user may press Alert User button 302 to make a request to issue an alert to printing device 120 from printing device 120.

Figure 3B:
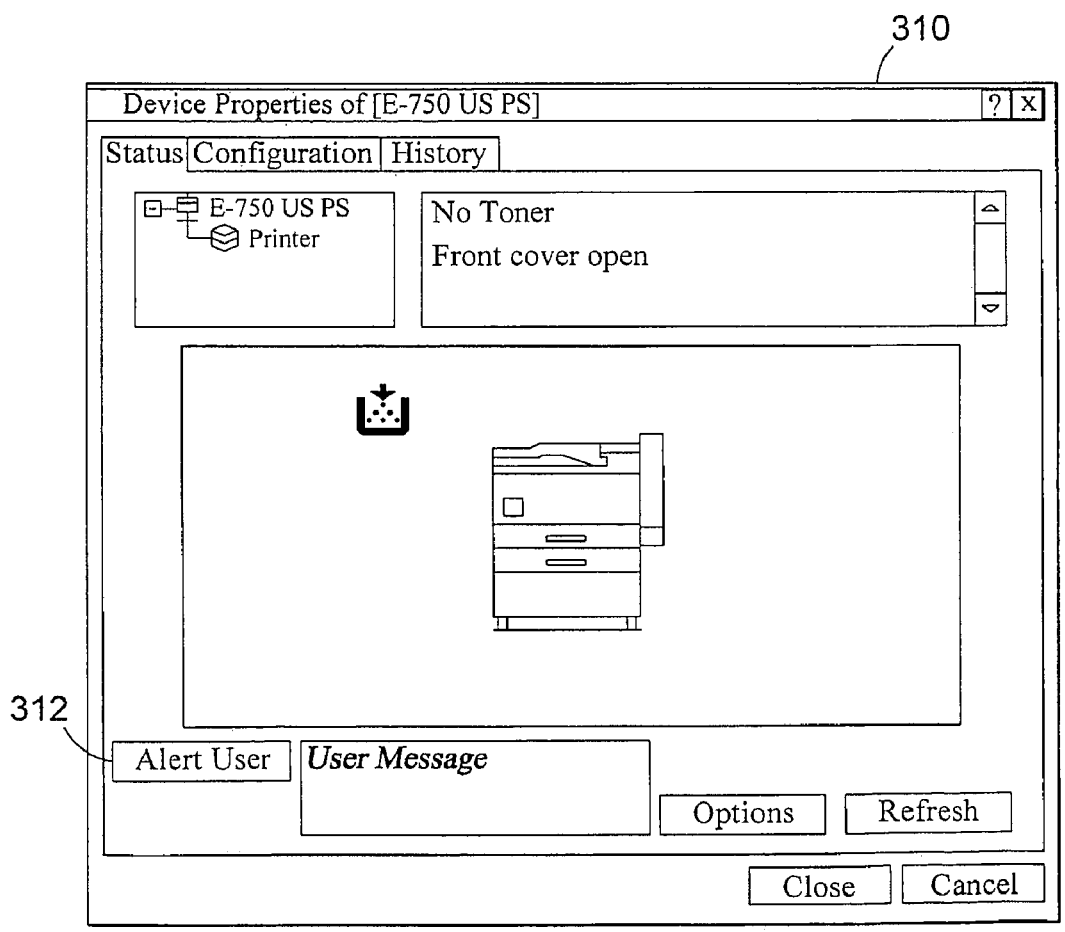
FIG. 3B is a graphical depiction of an interface, provided by a client, through which a request for the issuance of an alert may be made according to an embodiment of the invention.

In another embodiment, the request to issue an alert may be made by the initiating user using a client. FIG. 3B is a graphical depiction of interface 310 displayed on client 110. A request for the issuance of an alert may be made using interface 310 according to an embodiment of the invention. The initiating user may select Alert User control 310 on interface 310 to make a request to issue an alert from client 110, over communications link 130, to printing device 120.

Figure 4A:
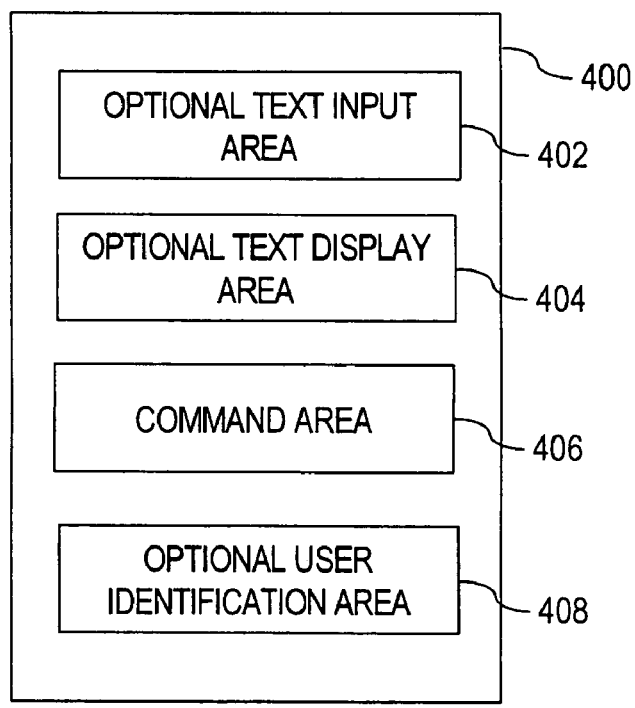
FIG. 4A is a graphical depiction of an illustrative graphical user interface for requesting the issuance of an alert according to an embodiment of the invention.

The interface that the initiating user may use to make a request to issue an alert may vary from implementation to implementation. To illustrate, FIG. 4A is a graphical depiction of an illustrative graphical user interface (GUI) 400 for making a request, to printing device 120, to issue an alert according to an embodiment of the invention. GUI 400 represents an illustrative interface for making a request to printing device 120 to issue an alert, as other embodiment not depicted in FIG. 4A may employ an interface having a different set of dimensions, features, and/or screens. GUI 400 of FIG. 4A may be displayed at any location, such as printing device 120 or client 110.

GUI 400 includes an optional text input area 402, optional text display area 404, a command area 406, and an optional user identification area 408. Optional text input area 402 refers to any GUI component that allows a user to enter text. For example, in one embodiment, optional text input area 402 may allow a user to enter text into a textbox. Optional text display area 404 refers to any GUI component that allows a user to view text. For example, optional text display area 404 may be used to display a set of instructions to the user or display a message from another user who requested a print request to be processed by printing device 120. In an embodiment (not depicted in FIG. 4A), optional text input area 402 and optional text display area 404 may be implemented using the same area, e.g., text may be displayed to the user in the textbox that the user may use to submit text.

In another embodiment, optional text input area 402 may display two or more text messages from which a user may select. The text message that the user selects will be incorporated into the issued alert. Thus, the text messages displayed in optional text input area 402 may correspond to problem conditions that a printing device may experience. In this way, the user requesting the issuance of the alert may configure the alert to contain language describing the nature of the problem without having to manually enter in such language through GUI 400.

Command area 406 refers to any GUI component that allows a user to initiate a command. Optional user identification area 408 refers to any GUI component that may identify who is the intended recipient of the alert. As suggested by their names, optional text input area 402. optional text display area 404, and optional user identification area 408 are optional.

To illustrate how GUI 400 may be used in practice, several examples of an illustrative interface to issuing an alert shall now be described. FIG. 4B is a graphical depiction of a first workflow of an illustrative graphical user interface (GUI) 410 for requesting the issuance of an alert according to an embodiment of the invention. As shown in FIG. 4B, GUI 410 does not contain an optional user identification area 406. GUI 410 does contain text input/out area 412, which operates as described above with reference to optional text input/output area 402. The command area 404 of GUI 410 is represented by send alert control 414 and send detailed alert control 416. When the initiating user selects either send alert control 414 or send detailed alert control 416, a request to issue an alert is generated and is received by printing device 120. However, send detailed alert control 416 additionally requests that the alert, once issued, contain detailed information about the problem being experienced by printing device 120. This detailed information may be automatically generated by printing device 120 or may be supplied by the initiating user using text input/output area 412.

After the initiating user requests the issuance of an alert, the recipient of the issued alert may confirm receipt of the issued alert to the initiating user. An illustration of this is shown in FIG. 4B. As shown in FIG. 4B, after the recipient of the issued alert confirms receipt of the issued alert, confirmation of the receipt of the alert may be displayed in text input/output area 412. In this way, the initiating user may be informed that the recipient of the alert is aware of the problem printing device 120 is experiencing, and may further infer that the recipient of the alert will take responsibility of the problem. Additional details about how a recipient of an alert may confirm receipt of the alert shall be presented below.

As another example of an interface that may be used to request the issuance of an alert, FIG. 4C is a block diagram of a workflow of a graphical illustrative user interface (GUI) 420 for requesting the issuance of an alert according to another embodiment of the invention. Command area 404 is represented in GUI 420 as send alert control 422. When the user selects send alert control 420, GUI 420 causes a request to issue an alert to be received by printing device 120. Optional user identification area 406 is represented in GUI 420 as user identification area 422, which identifies the intended recipient of the alert.

As shown in FIG. 4C, after send alert control 422 has been selected by the initiating user, a message is displayed on GUI 420 informing the initiating user that the alert has been issued, but that the alert has not yet been confirmed by the recipient of the alert. Once the recipient of the alert has confirmed the issued alert, a message is shown in GUI 420 indicating that the alert was confirmed, and any action that the recipient of the alert may have taken. For example, in FIG. 4C, GUI 420 indicates the time that the recipient of the alert confirmed receipt of the alert and that the recipient of the alert cancelled his print job.

In an embodiment, the request to issue an alert, received in step 210 by printing device 120, may contain or identify a digital picture. For example, printing device 120 may contain or be operationally connected to a digital camera or the initiating user may have in his or her possession a digital camera. The initiating user may use the digital camera to take a digital picture of printing device 120. In this way, the problem that printing device 120 is currently experiencing may be expressed using in a digital picture. The initiating user may then upload the digital picture to printing device 120, and configure the request to issue the alert to identify the digital picture. The alert, once issued, will either contain or identify the digital picture.

In an embodiment of the invention, either before the initiating user may send a request for the issuance of an alert to printing device 120 or before the request for the issuance of an alert is processed by printing device 120, the identity or permission level of the initiating user may need to be confirmed.

After the request to issue the alert is received at printing device 120, step 220 is performed.

Consulting Contact Data for the Recipient of the Alert

In the performance of step 220, printing device 120 consults contact data 122 for each identified recipient of the alert. The purpose of consulting contact data 122 in step 220 is for printing device 120 to determine how to issue the alert to each identified recipient of the alert.

In an embodiment, printing device 120 identifies that the alert is to be sent to a particular user because, at the time when printing device 120 receives the request to issue an alert from the first user, printing device 120 is unable to complete processing of request to process an electronic document issued by the particular user. For example, while printing device 120 is processing a print request from a second user, printing device 120 may run out of paper, become jammed, or the output tray of printing device 120 may become too full to accommodate additional output. In each case, printing device 120 may become unable to complete further processing of the second user's print request. As a result, the printing device 120 may determine that the second user is to receive the alert in step 210, and thereafter consult contact data 122 for the second user to determine how to issue the alert to the second user.

In an embodiment, in addition to sending an alert to the user whose request printing device 120 is currently attempting to process, printing device 120 may issue an alert to any user that sent a request to process an electronic document to printing device 120 that has not been fully processed. To illustrate, assume that ten users have each sent a print request to printing device 120, and printing device 120 has not yet fully processed any of the ten print requests. If printing device 120 encounters a problem that prevents it from processing any additional requests, it may be advantageous to notify any user who has sent a request to printing device 120 that printing device 120 has not fully processed. In this example, printing device 120 may issue an alert to each of the ten users, rather than to just the single user whose print request printing device 120 was attempting to process when printing device 120 encountered the problem. In such an embodiment, in step 220, printing device 120 may consult contact data 122 for each of the ten users to determine how to send an alert to each of the ten users.

After printing device 120 consults contact data 122 for each identified recipient of the alert, step 230 is performed.

Issuing the Alert

In the performance of step 230, printing device 120 issues the alert to each identified recipient of the alert in accordance with contact data 122 for each identified recipient. In an embodiment, printing device 120 issues an alert to any user that sent a request to process a document to printing device 120 that has not been fully processed.

The information contained in the alert may vary. In an embodiment, the issued alert identifies one or more problem conditions of which the printing device is experiencing. In this way, the recipient of the alert may become informed of the problem which printing device 120 is experiencing, and may thereafter attempt to remedy the problem.

The nature of how an alert is delivered may vary from implementation to implementation. Certain embodiments provide the alert to an intended recipient by playing a sound recording to the recipient. For example, contact data 122 may specify that a first user is to receive an alert by playing a sound file at a particular client and a second user is to receive an alert by receiving a phone call of a recorded message on his cell phone.

Figure 5A:
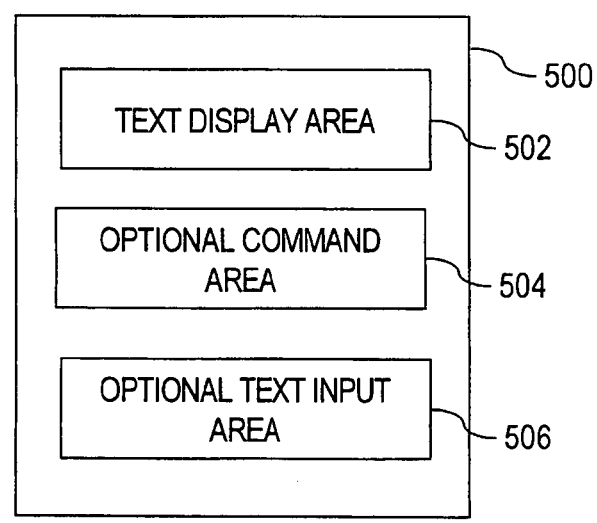
FIG. 5A is a graphical depiction of a illustrative graphical user interface for receiving an alert according to an embodiment of the invention.

In other embodiments of the invention, contact data 122 may specify that a user is to receive an alert through a message displayed on an interface. The interface that a user may use to receive an issued alert may vary from implementation to implementation. To illustrate, FIG. 5A is a graphical depiction of an illustrative graphical user interface (GUI) 500 for receiving an alert according to an embodiment of the invention. Embodiments of the invention may employ an interface for receiving an issued alert that differs in appearance from GUI 500 depicted in FIG. 5A, as interfaces for receiving issued alerts may have a different set of dimensions, areas, and sub-screens. GUI 500 of FIG. 4A may be displayed at any location associated with the recipient of the alert, such as client 112.

GUI 500 includes text display area 502, optional command area 504, and an optional text input area 506. Text display area 502 refers to any GUI component that allows text to be displayed to a user. Optional command area 504 refers to any GUI component that allows a user to initiate a command, such as confirming receipt of the alert. Optional text input area 506 refers to any GUI component that allows a recipient of the alert to submit text. As suggested by their names, optional command area 504 and optional text input area 506 are optional. In an embodiment, text display area 502 and optional text input area 506 may be implemented by the same area, e.g., e.g., text may be displayed to the user in the textbox that the user may use to submit text.

Figure 5B:
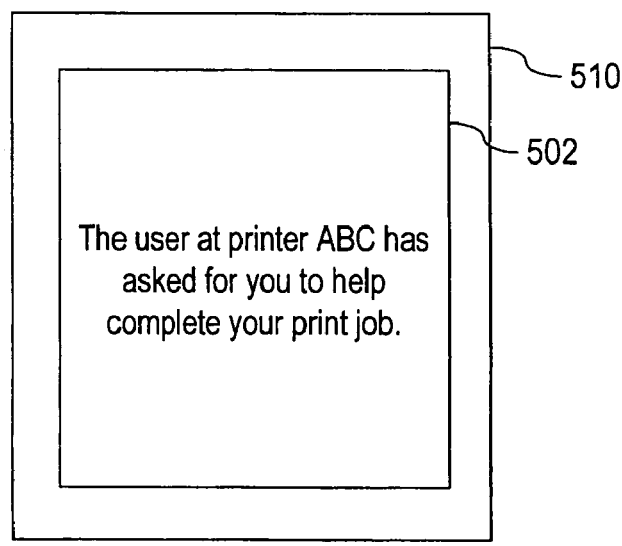
FIG. 5B is a graphical depiction of a illustrative graphical user interface for receiving an alert according to another embodiment of the invention.

To illustrate how GUI 500 may be used in practice, several examples of an illustrative interface for receiving an alert shall now be described. FIG. 5B is a graphical depiction of an illustrative graphical user interface (GUI) 510 for receiving an alert according to an embodiment of the invention. As shown in FIG. 5B, GUI 510 contains a text display area 502, but does not contain either an optional command area 504 or an optional text input area 506. The text display area 502 of GUI 510 serves to inform the recipient of the alert that a problem is being experienced by a printing device (namely printing device 120) to which the recipient issued a request to process a document. While other embodiments not depicted in FIG. 5B may do so, the message displayed in text display area 502 of FIG. 5B neither identifies the nature of the problem nor contains any controls to enable the recipient to take any further action. Also, while other embodiments not depicted in FIG. 5B may do so, the issued alert of FIG. 5B does not identify, to the recipient of the alert, the identity of the initiating user.

Figure 5C:
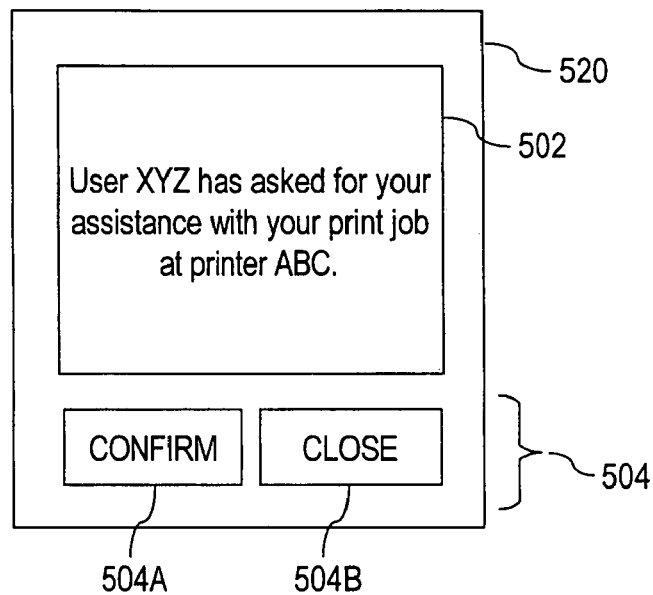
FIG. 5C is a graphical depiction of a illustrative graphical user interface for receiving an alert according to another embodiment of the invention.

As another example of an interface for receiving an alert, FIG. 5C is a graphical depiction of an illustrative graphical user interface (GUI) 520 for receiving an alert according to another embodiment of the invention. As shown in FIG. 5C, GUI 520 includes text display area 502 and optional command area 504. Optional command area 504 includes confirm control 504A and close control 504B. When the recipient of the alert selects confirm control 504A, GUI 520 confirms to the initiating user that the recipient of the alert received the alert. When the recipient of the alert selects close control 504B, GUI 520 closes without confirming receipt of the issued alert to the initiating user. As shown in FIG. 5C, text display area 502 indicates to the recipient (a) a problem is being experienced by a particular printing device to which the recipient issued a request to process a document, and (b) the identity of the initiating user. The message displayed in text display area 502 in FIG. 5C is merely exemplary, as other embodiments may contain different language or provide different information in text display area 502.

As another example of an interface for receiving an alert, FIG. 5D is a graphical depiction of an illustrative graphical user interface (GUI) 530 for receiving an alert according to another embodiment of the invention. As shown in FIG. 5D, GUI 530 contains text display area 502, optional command area 504, and optional text input area 506. Optional command area 504 is represented as the confirm control, the cancel control, and the reroute control. Operation of the confirm control and the cancel control were explained above with reference to FIG. 5C. If the recipient enter text into optional text input area 506, when the recipient selects the confirm control, the text entered into optional text input area 506 will be displayed to the initiating user, e.g., the text may be displayed as shown to the initiating user on an interface as shown in FIG. 4B.

When the recipient of the alert selects the reroute control, any requests to process documents, issued by the recipient to the printing device that issued the alert, are rerouted to a different printing device. Rerouting a print request to a different printing device may be useful when the original printing device to which it was sent is inoperable or otherwise unable to complete processing of the print request. The printing device to which a request is rerouted to may be chosen by the user or automatically selected based on a set of factors, such as availability and proximity to the user. In an embodiment, selection of the reroute control causes an entire print job to be rerouted to another printing device. According to another embodiment, selection of the reroute control causes only the unprocessed portion of a print job to be rerouted to another printing device.

Advantageously, embodiments of the invention greatly increase the productivity of shared devices, such as a printing device. While embodiments of the invention have been described above with reference to printing devices, alerts may be issued for any shared office device. As a result, the approaches discussed herein may be used with any shared device, and embodiments of the invention are not limited to the context of printing an electronic document.

In an embodiment, whenever an alert is issued by printing device 120, the issued alert may also be sent to a specified user responsible for maintaining printing device 120. In this way, the IT department or local administrator responsible for maintaining printing device 120 may be kept informed of the problems which printing device 120 is experiencing.

In an embodiment, it is possible that a user may issue an alert to an administrator of printing device 120, rather than to a user that issued a print request to printing device 120. For example, printing device 120 may not be processing any user specific jobs or requests from other users when a user issues an alert to printing device 120. In such a case, printing device 120 may prompt the user to send an alert to an administrator contact or service contact that has been defined for printing device 120.

Implementing Mechanisms

Printing device 120 may process a request to issue an alert according to a variety of different mechanisms. FIG. 7 is a sequence diagram of processing an alert according to one embodiment of the invention. The sequence diagram illustrating in FIG. 7 is merely exemplary of one embodiment of the invention, as other embodiments of the invention not depicted in FIG. 7 may also perform the functional steps of FIG. 2. Consequently, the sequence diagram of FIG. 7 should not be used to characterize any specific structure that all embodiments of the invention possess or steps that all embodiments of the invention perform, as other embodiments of the invention need not possess all the structural elements discussed in FIG. 7 and/or need not perform all the steps depicted in FIG. 7.

The sequence diagram of FIG. 7 shall be explained below with reference to FIG. 1. For ease of explanation, the client of the user issuing a print request, depicted in FIG. 7, shall correspond to client 110 of FIG. 1, and the client of the user issuing an alert shall correspond to client 112. The communication module, the spooler, the printer control, and the alert process may each be implemented as a functional component of printing device 120. In the embodiment discussed with reference to FIG. 7, the communication module, the spooler, the printer control, and the alert process may each be implemented as a separate functional component of printing device 120. However, in other embodiments, a single functional component of printing device 120 may perform the functions associated with two or more of the communication module, the spooler, the printer control, and the alert process.

As shown in FIG. 7, initially a user issues a print request using a client, such as client 110 of FIG. 1. For example, a user may use client 110 to perform this action by instructing client 110 to send a print request to printing device 120. The print request is received, by printing device 120, at a communication module. A communication module is a software module, executing at a printing device, which enables the printing device to communicate with clients. The communication module stores information, such as contact data, that allows the communication module to communicate with clients.

After the communication module receives a print request from a client, the communication module spools the print request to the spooler. A spooler is a software module, executing at a printing device, which sequences print request by temporarily storing them in a buffer and subsequently sends each print request, in sequence, to the printer control when the printer control is able to process a print request. The printer control is the component responsible for processing a print request at a printing device. Once the printer control receives a print request from the spooler, the printer control attempts to process the print request. Once the printer control has fully processed a print request, the document identified by the print request is printed as specified by the print request.

A user may decide to issue an alert to printing device 120. As shown in FIG. 7, a client of the user issuing the alert (such as client 112 in FIG. 1) may send a request for an alert to printing device 120. The request to issue an alert is received by an alert process at printing device 120. An alert process is a software module, executing at a printing device, which enables the printing device to receive and process requests to issue an alert. An alert process maintains information about how to contact each client that requests an alert. When the alert process receives the request to issue an alert, the alert process determines if the printer control is currently attempting to process a particular print request. If so, then the alert process retrieves, from the printer control, information about the particular print request that the printer control is attempting to process. For example, such information may identify the client that issued the particular print request that the printer control is attempting to process.

The alert process then instructs the communication module to issue the requested alert. If the printer control is currently attempting to process a particular print request, then the alert process also identifies, to the communication module, which client issued the particular print request that the printer control is attempting to process. As the communication module maintains information about how to contact each client, the communication module may send, to the client that issued the particular print request, the requested alert.

On the other hand, if the alert process determines that the printer control is not currently attempting to process a particular print request, then the alert process also notifies the communication module, when instructing the communication module to issue an alert, that no print requests are currently being processed by the printer control. In this case, the communication module may issue the alert to a designed client, such as a client associated with an administrator contact or service contact that has been defined for printing device 120. Note that this scenario is not depicted in FIG. 7, because, as illustrated in FIG. 7, the user that issued a print request is the same user who received the requested alert.

Once the user receives an alert, the user may issue a response to the alert. For example, a user may respond to a received alert by issuing a response to the alert using client 110 to be received by the communication module of printing device 120. The communication module will thereafter relay the response to the alert process, which in turn communicates the response to the client of the user that issued the alert. Since the alert process maintains information about how to contact each client that requests an alert, the alert process is able to send, to the client of the user that requested the alert, the response from the user receiving the alert.

In an embodiment, the user who receives an issued alert may perform one or more optional actions, such as cancelling a print request or fixing a paper jam. The user may submit data identifying an action taken by the user using a client to printing device 120. For example, the user may use client 112 to submit data that requests the cancellation of a previously submitted print request to printer control.

Figure 6:
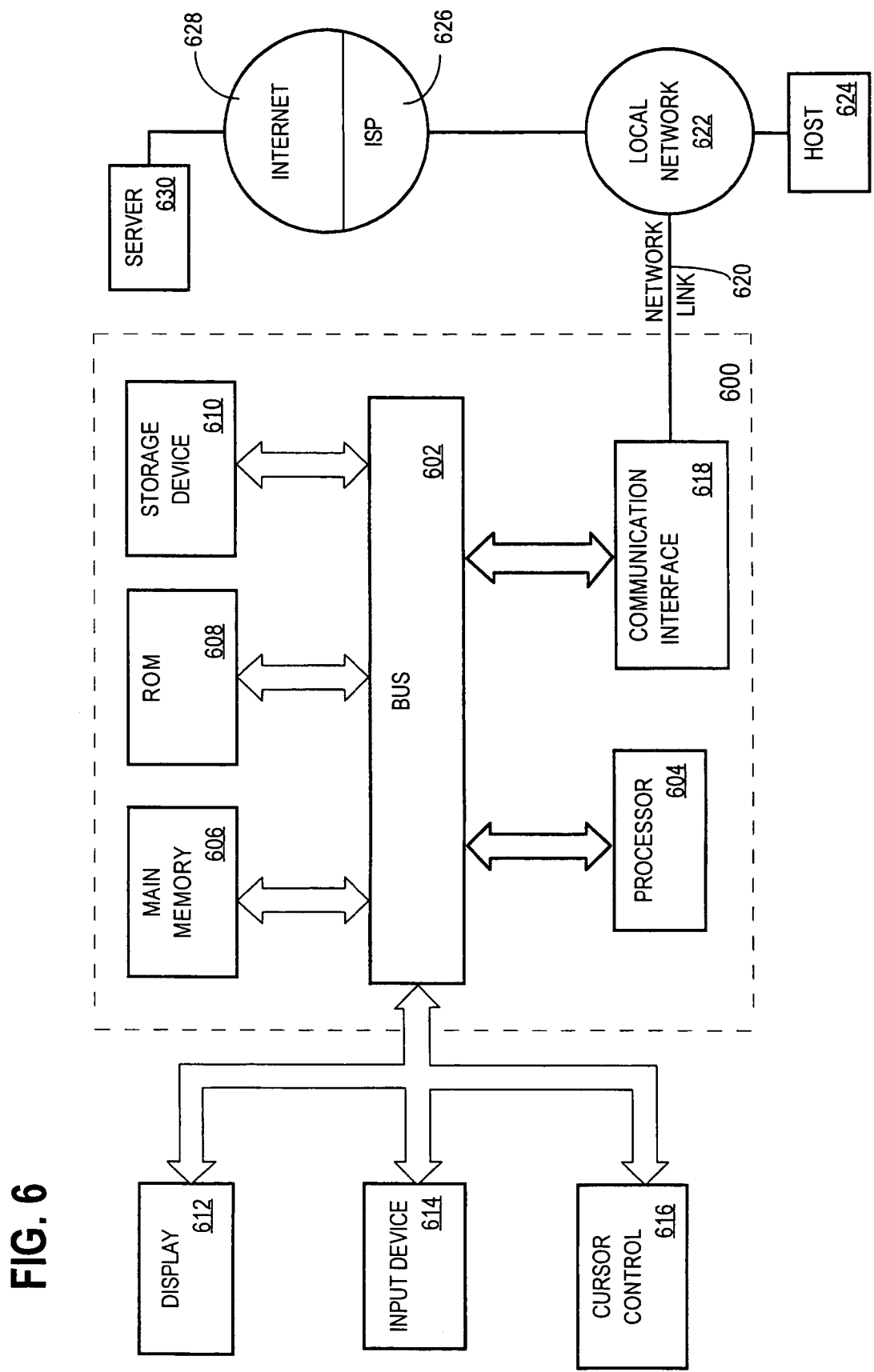
FIG. 6 is a block diagram that illustrates a computer system upon which an embodiment of the invention may be implemented.

In an embodiment, one or more of client 110, client 112, and printing device 120 may be implemented on or using a computer system. FIG. 6 is a block diagram that illustrates a computer system 600 upon which an embodiment of the invention may be implemented. Computer system 600 includes a bus 602 or other communication mechanism for communicating information, and a processor 604 coupled with bus 602 for processing information. Computer system 600 also includes a main memory 606, such as a random access memory (RAM) or other dynamic storage device, coupled to bus 602 for storing information and instructions to be executed by processor 604. Main memory 606 also may be used for storing temporary variables or other intermediate information during execution of instructions to be executed by processor 604. Computer system 600 further includes a read only memory (ROM) 608 or other static storage device coupled to bus 602 for storing static information and instructions for processor 604. A storage device 610, such as a magnetic disk or optical disk, is provided and coupled to bus 602 for storing information and instructions.

Computer system 600 may be coupled via bus 602 to a display 612, such as a cathode ray tube (CRT), for displaying information to a computer user. An input device 614, including alphanumeric and other keys, is coupled to bus 602 for communicating information and command selections to processor 604. Another type of user input device is cursor control 616, such as a mouse, a trackball, or cursor direction keys for communicating direction information and command selections to processor 604 and for controlling cursor movement on display 612. This input device typically has two degrees of freedom in two axes, a first axis (e.g., x) and a second axis (e.g., y), that allows the device to specify positions in a plane.

The invention is related to the use of computer system 600 for implementing the techniques described herein. According to one embodiment of the invention, those techniques are performed by computer system 600 in response to processor 604 executing one or more sequences of one or more instructions contained in main memory 606. Such instructions may be read into main memory 606 from another machine-readable medium, such as storage device 610. Execution of the sequences of instructions contained in main memory 606 causes processor 604 to perform the process steps described herein. In alternative embodiments, hard-wired circuitry may be used in place of or in combination with software instructions to implement the invention. Thus, embodiments of the invention are not limited to any specific combination of hardware circuitry and software.

The term "machine-readable medium" as used herein refers to any medium that participates in providing data that causes a machine to operation in a specific fashion. In an embodiment implemented using computer system 600, various machine-readable media are involved, for example, in providing instructions to processor 604 for execution. Such a medium may take many forms, including but not limited to, non-volatile media, volatile media, and transmission media. Non-volatile media includes, for example, optical or magnetic disks, such as storage device 610. Volatile media includes dynamic memory, such as main memory 606. Transmission media includes coaxial cables, copper wire and fiber optics, including the wires that comprise bus 602. Transmission media can also take the form of acoustic or light waves, such as those generated during radio-wave and infra-red data communications. All such media must be tangible to enable the instructions carried by the media to be detected by a physical mechanism that reads the instructions into a machine.

Common forms of machine-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of machine-readable media may be involved in carrying one or more sequences of one or more instructions to processor 604 for execution. For example, the instructions may initially be carried on a magnetic disk of a remote computer. The remote computer can load the instructions into its dynamic memory and send the instructions over a telephone line using a modem. A modem local to computer system 600 can receive the data on the telephone line and use an infra-red transmitter to convert the data to an infra-red signal. An infra-red detector can receive the data carried in the infra-red signal and appropriate circuitry can place the data on bus 602. Bus 602 carries the data to main memory 606, from which processor 604 retrieves and executes the instructions. The instructions received by main memory 606 may optionally be stored on storage device 610 either before or after execution by processor 604.

Computer system 600 also includes a communication interface 618 coupled to bus 602. Communication interface 618 provides a two-way data communication coupling to a network link 620 that is connected to a local network 622. For example, communication interface 618 may be an integrated services digital network (ISDN) card or a modem to provide a data communication connection to a corresponding type of telephone line. As another example, communication interface 618 may be a local area network (LAN) card to provide a data communication connection to a compatible LAN. Wireless links may also be implemented. In any such implementation, communication interface 618 sends and receives electrical, electromagnetic or optical signals that carry digital data streams representing various types of information.

Network link 620 typically provides data communication through one or more networks to other data devices. For example, network link 620 may provide a connection through local network 622 to a host computer 624 or to data equipment operated by an Internet Service Provider (ISP) 626. ISP 626 in turn provides data communication services through the world wide packet data communication network now commonly referred to as the "Internet" 628. Local network 622 and Internet 628 both use electrical, electromagnetic or optical signals that carry digital data streams. The signals through the various networks and the signals on network link 620 and through communication interface 618, which carry the digital data to and from computer system 600, are exemplary forms of carrier waves transporting the information.

Computer system 600 can send messages and receive data, including program code, through the network(s), network link 620 and communication interface 618. In the Internet example, a server 630 might transmit a requested code for an application program through Internet 628, ISP 626, local network 622 and communication interface 618.

The received code may be executed by processor 604 as it is received, and/or stored in storage device 610, or other non-volatile storage for later execution. In this manner, computer system 600 may obtain application code in the form of a carrier wave.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method for issuing an alert that indicates that a problem has occurred at a printing device, comprising:
   receiving, at the printing device, from a first user, a request to issue the alert to a second user, wherein the request does not identify the second user;
   in response to receiving the request from the first user, the printing device determining how to issue the alert to the second user; and
   the printing device issuing the alert to the second user to indicate that the problem has occurred at the printing device.

2. The method of claim 1, further comprising:
   the printing device identifying that the alert is to be sent to the second user because, at the time when the printing device receives the request from the first user, the printing device is unable to complete processing of a print request issued by the second user.

3. The method of claim 1, wherein the request is issued by the first user through an interface provided by the printing device.

4. The method of claim 1, wherein the request is issued by the first user through an interface provided by a client operatively connected to the printing device over a network.

5. The method of claim 1, wherein the issued alert does not identify the first user to the second user.

6. The method of claim 1, further comprising:
   in response to receiving the request from the first user, the printing device issuing one or more alerts to other users who submitted print requests to the printing device subsequent to the second user.

7. The method of claim 1, further comprising:
   in response to receiving, at the printing device, from the second user, a response to the issued alert, the printing device sending, to the first user, a message indicating the second user received the alert.

8. The method of claim 1, further comprising:
   in response to receiving, at the printing device, from the second user, a response to the issued alert, either cancelling processing of a print request at the printing device or rerouting, at least a portion of, the print request to another printing device.

9. The method of claim 1, wherein the printing device issuing the alert comprises:
   the printing device issuing the alert to the second user using one or more of an instant message (IM), an email, a phone call, a phone text message, a pager, a pop-up window displayed on a client associated with the second user, and a message displayed through an interface on a client associated with the second user.

10. The method of claim 1, further comprising:
    the printing device providing, to the first user, two or more text messages from which the first user may select,
    wherein the request from the first user identifies one or more of the two or more text messages.

11. The method of claim 1, further comprising:
    the printing device taking or receiving a digital picture, and wherein the issued alert contains or identifies the digital picture.

12. The method of claim 1, wherein the alert issued to the second user includes information from the request to issue the alert received by the printing device from the first user.

13. The method of claim 1, wherein the issued alert identifies one or more problem conditions of which the printing device is experiencing.

14. The method of claim 1, wherein the identity of the second user is not made available to the first user.

15. The method of claim 1, wherein the determining how to issue the alert to the second user is performed by consulting contact data.

16. The method of claim 1, wherein the second user previously submitted a print request to the printing device.

17. The method of claim 1, wherein the printing device is currently not processing any other requests from other users, and wherein the second user is an administrator contact or service contact for the printing device.

18. A machine-readable physical medium carrying one or more sequences of instructions for issuing an alert that indicates that a problem has occurred at a printing device, wherein execution of the one or more sequences of instructions by one or more processors causes:
   receiving, at a printing device, from a first user, a request to issue the alert to a second user who submitted a print request to the printing device, wherein the request does not identify the second user;
   in response to receiving the request from the first user, the printing device determining how to issue the alert to the second user; and
   the printing device issuing the alert to the second user to indicate that the problem has occurred at the printing device.

19. The machine-readable physical medium of claim 18, wherein execution of the one or more sequences of instructions by the one or more processors further causes:

the printing device identifying that the alert is to be sent to the second user because, at the time when the printing device receives the request from the first user, the printing device is unable to complete processing of a print request issued by the second user.

20. The machine-readable physical medium of claim 18, wherein the request is issued by the first user through an interface provided by the printing device.

21. The machine-readable physical medium of claim 18, wherein the request is issued by the first user through an interface provided by a client operatively connected to the printing device over a network.

22. The machine-readable physical medium of claim 18, wherein the issued alert does not identify the first user to the second user.

23. The machine-readable physical medium of claim 18, wherein execution of the one or more sequences of instructions by the one or more processors further causes:

in response to receiving the request from the first user, the printing device issuing one or more alerts to other users who submitted print requests to the printing device subsequent to the second user.

24. The machine-readable physical medium of claim 18, wherein execution of the one or more sequences of instructions by the one or more processors further causes:

in response to receiving, at the printing device, from the second user, a response to the issued alert, the printing device sending, to the first user, a message indicating the second user received the alert.

25. The machine-readable physical medium of claim 18, wherein execution of the one or more sequences of instructions by the one or more processors further causes:

in response to receiving, at the printing device, from the second user, a response to the issued alert, either cancelling processing of a print request at the printing device or rerouting, at least a portion of, the print request to another printing device.

26. The machine-readable physical medium of claim 18, wherein the printing device issuing the alert comprises:

the printing device issuing the alert to the second user using one or more of an instant message (IM), an email, a phone call, a phone text message, a pager, a pop-up window displayed on a client associated with the second user, and a message displayed through an interface on a client associated with the second user.

27. The machine-readable physical medium of claim 18, wherein execution of the one or more sequences of instructions by the one or more processors further causes:

the printing device providing, to the first user, two or more text messages from which the first user may select, wherein the request from the first user identifies one or more of the two or more text messages.

28. The machine-readable physical medium of claim 18, wherein execution of the one or more sequences of instructions by the one or more processors further causes:

the printing device taking or receiving a digital picture, and wherein the issued alert contains or identifies the digital picture.

29. The machine-readable physical medium of claim 18, wherein the alert issued to the second user includes information from the request to issue the alert received by the printing device from the first user.

30. The machine-readable physical medium of claim 18, wherein the issued alert identifies one or more problem conditions of which the printing device is experiencing.

31. The machine-readable physical medium of claim 18, wherein the identity of the second user is not made available to the first user.

32. The machine-readable physical medium of claim 18, wherein the determining how to issue the alert to the second user is performed by consulting contact data.

33. The machine-readable physical medium of claim 18, wherein the second user previously submitted a print request to the printing device.

34. The machine-readable physical medium of claim 18, wherein the printing device is currently not processing any other requests from other users, and wherein the second user is an administrator contact or service contact for the printing device.

35. An apparatus for issuing an alert that indicates that a problem has occurred at a printing device, comprising:

one or more processors; and a machine-readable medium carrying one or more sequences of instructions that when executed by the one or more processors, causes:

receiving, at a printing device, from a first user, a request to issue the alert to a second user who submitted a print request to the printing device, wherein the request does not identify the second user;

in response to receiving the request from the first user, the printing device determining how to issue the alert to the second user; and the printing device issuing the alert to the second user to indicate that the problem has occurred at the printing device.

36. The apparatus of claim 35, wherein execution of the one or more sequences of instructions by the one or more processors further causes:

the printing device identifying that the alert is to be sent to the second user because, at the time when the printing device receives the request from the first user, the printing device is unable to complete processing of a print request issued by the second user.

37. The apparatus of claim 35, wherein the request is issued by the first user through an interface provided by the printing device.

38. The apparatus of claim 35, wherein the request is issued by the first user through an interface provided by a client operatively connected to the printing device over a network.

39. The apparatus of claim 35, wherein the issued alert does not identify the first user to the second user.

40. The apparatus of claim 35, wherein execution of the one or more sequences of instructions by the one or more processors further causes:

in response to receiving the request from the first user, the printing device issuing one or more alerts to other users who submitted print requests to the printing device subsequent to the second user.

41. The apparatus of claim 35, wherein execution of the one or more sequences of instructions by the one or more processors further causes:

in response to receiving, at the printing device, from the second user, a response to the issued alert, the printing device sending, to the first user, a message indicating the second user received the alert.

42. The apparatus of claim 35, wherein execution of the one or more sequences of instructions by the one or more processors further causes:

in response to receiving, at the printing device, from the second user, a response to the issued alert, either cancelling processing of a print request at the printing device or rerouting, at least a portion of, the print request to another printing device.

43. The apparatus of claim 35, wherein the printing device issuing the alert comprises:
the printing device issuing the alert to the second user using one or more of an instant message (IM), an email, a phone call, a phone text message, a pager, a pop-up window displayed on a client associated with the second user, and a message displayed through an interface on a client associated with the second user.

44. The apparatus of claim 35, wherein execution of the one or more sequences of instructions by the one or more processors further causes:
the printing device providing, to the first user, two or more text messages from which the first user may select,
wherein the request from the first user identifies one or more of the two or more text messages.

45. The apparatus of claim 35, wherein execution of the one or more sequences of instructions by the one or more processors further causes:
the printing device taking or receiving a digital picture, and wherein the issued alert contains or identifies the digital picture.

46. The apparatus of claim 35, wherein the alert issued to the second user includes information from the request to issue the alert received by the printing device from the first user.

47. The apparatus of claim 35, wherein the issued alert identifies one or more problem conditions of which the printing device is experiencing.

48. The apparatus of claim 35, wherein the identity of the second user is not made available to the first user.

49. The apparatus of claim 35, wherein the determining how to issue the alert to the second user is performed by consulting contact data.

50. The apparatus of claim 35, wherein the second user previously submitted a print request to the printing device.

51. The apparatus of claim 35, wherein the printing device is currently not processing any other requests from other users, and wherein the second user is an administrator contact or service contact for the printing device.

* * * * *

UNITED STATES PATENT AND TRADEMARK OFFICE
CERTIFICATE OF CORRECTION

| | | |
|---|---|---|
| PATENT NO. | : 7,697,851 B2 | Page 1 of 1 |
| APPLICATION NO. | : 11/499026 | |
| DATED | : April 13, 2010 | |
| INVENTOR(S) | : Kurt Knodt et al. | |

It is certified that error appears in the above-identified patent and that said Letters Patent is hereby corrected as shown below:

Title Page (75) Inventors
After "Soiba Mohammad" - delete "Sunnyvale" and insert --Winnetka--.

Column 16
Claim 35: Line 22: After "that" and before "when executed" insert --,--.

Signed and Sealed this

Twenty-fourth Day of August, 2010

David J. Kappos
*Director of the United States Patent and Trademark Office*